(12) United States Patent
Li (10) Patent No.: US 10,044,994 B1
(45) Date of Patent: Aug. 7, 2018

(54) PROJECTOR AND METHOD OF DRIVING THE SAME

(71) Applicants: BOE Technology Group Co., Ltd., Beijing (CN); Hefei BOE Optoelectronics Technology Co., Ltd., Anhui (CN)

(72) Inventor: Zhao Li, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/710,004

(22) Filed: Sep. 20, 2017

(30) Foreign Application Priority Data

Feb. 6, 2017 (CN) .......................... 2017 1 0067344

(51) Int. Cl.
| | | |
|---|---|---|
| H04N 9/31 | (2006.01) | |
| G03B 21/14 | (2006.01) | |
| G03B 21/28 | (2006.01) | |
| H04N 5/74 | (2006.01) | |
| G03B 21/00 | (2006.01) | |

(52) U.S. Cl.
CPC ......... *H04N 9/3155* (2013.01); *G03B 21/006* (2013.01); *G03B 21/008* (2013.01); *G03B 21/142* (2013.01); *G03B 21/28* (2013.01); *H04N 5/7441* (2013.01); *H04N 9/317* (2013.01); *H04N 9/3114* (2013.01); *H04N 9/3182* (2013.01); *H04N 2005/745* (2013.01)

(58) Field of Classification Search
CPC ...... H04N 9/31; H04N 9/3102; H04N 9/3108; H04N 9/3114; G03B 21/14; G03B 21/008; G03B 21/005
USPC .......................................... 348/742, 743, 771
See application file for complete search history.

(56) References Cited

U.S. PATENT DOCUMENTS 7,722,190 B2 * 5/2010 Weng .................. H04N 9/3114
353/121

* cited by examiner

*Primary Examiner* — William C Dowling
(74) *Attorney, Agent, or Firm* — Westman, Champlin & Koehler, P.A.

(57) ABSTRACT

Embodiments of the present disclosure provide a projector and a method of driving a projector. The projector includes an image source for generating an image light and a transmission and reflection element. The image light includes a bright-state region image light and a dark-state region image light. The transmission and reflection element includes transmission and reflection units. Each of the transmission and reflection units is configured to reflect the image light irradiated thereon when in a reflective state, and to transmit the image light irradiated thereon when in a transmissive state. The transmission and reflection element is configured to perform one of a transmission and a reflection on the bright-state region image light so that the bright-state region image light is projected and displayed, and perform the other on the dark-state region image light so that the dark-state region image light is not projected and displayed.

20 Claims, 4 Drawing Sheets

PROJECTOR AND METHOD OF DRIVING THE SAME

CROSS-REFERENCE TO RELATED APPLICATION

This application claims the benefit of Chinese Patent Application No. 201710067344.8, filed with the State Intellectual Property Office of China on Feb. 6, 2017, the whole disclosure of which is incorporated herein by reference.

BACKGROUND

1. Technical Field

Embodiments of the present disclosure relate to a projector and a method of driving the projector.

2. Description of the Related Art

A projector is a display apparatus which magnifies a small picture by a lens and then images the amplified picture on a screen.

SUMMARY

Embodiments of the present disclosure provide a projector comprising: an image source configured to generate an image light and emit the image light, the image light comprising a bright-state region image light and a dark-state region image light; and a transmission and reflection element comprising a plurality of transmission and reflection units, wherein each of the transmission and reflection units has a reflective state and a transmissive state, and is configured to reflect the image light irradiated on it when in the reflective state, and to transmit the image light irradiated on it when in the transmissive state; wherein the transmission and reflection element is disposed on a light output side of the image source, and is configured to perform one of a transmission and a reflection on the bright-state region image light so that the bright-state region image light is projected and displayed, and to perform the other of the transmission and the reflection on the dark-state region image light so that the dark-state region image light is not projected and displayed.

According to embodiments of the present disclosure, the transmission and reflection unit comprises an electrochromic unit.

According to embodiments of the present disclosure, the plurality of transmission and reflection units are arranged in an array.

According to embodiments of the present disclosure, the image source further comprises a display unit comprising a plurality of pixels.

According to embodiments of the present disclosure, the dark-state region image light corresponds to an image light of the pixel having a gray scale value of zero.

According to embodiments of the present disclosure, one of the plurality of transmission and reflection units which is in the transmissive state corresponds to at least one of the plurality of pixels which is in the closed state, or one of the plurality of transmission and reflection units which is in the reflective state corresponds to at least one of the plurality of pixels which is in the closed state.

According to embodiments of the present disclosure, the plurality of transmission and reflection units of the transmission and reflection element are in a one-to-one correspondence with the plurality of pixels of the display unit, and an image light emitted by every one of the plurality of pixels of the display unit is irradiated on one of the transmission and reflection units corresponding to the one of the plurality of pixels.

According to embodiments of the present disclosure, the projector further comprises: a first control unit configured to control each of the plurality of pixels to be in an open state or a closed state; and a second control unit configured to control each of the plurality of transmission and reflection units to be in the reflective state or the transmissive state, wherein the first control unit and the second control unit are further configured to control one of the plurality of transmission and reflection units to be in the transmissive state when one of the plurality of pixels corresponding to the one of the plurality of transmission and reflection units is in the closed state, or to control one of the plurality of transmission and reflection units to be in the reflective state when one of the plurality of pixels corresponding to the one of the plurality of transmission and reflection units is in the closed state.

According to embodiments of the present disclosure, the dark-state region image light corresponds to an image light of the pixel having a gray scale value of zero.

According to embodiments of the present disclosure, the transmission and reflection element is configured to perform the reflection on the bright-state region image light so that the bright-state region image light is projected and displayed, and to perform the transmission on the dark-state region image light so that the dark-state region image light is not projected and displayed, and the projector further comprises a light absorbing layer, and the light absorbing layer is disposed on a side of the transmission and reflection element away from the image source, and is configured to absorb the dark-state region image light transmitted by the transmission and reflection element.

According to embodiments of the present disclosure, one of the plurality of transmission and reflection units which is in the transmissive state corresponds to one of the plurality of pixels which is in the closed state, or one of the plurality of transmission and reflection units which is in the reflective state corresponds to one of the plurality of pixels which is in the closed state.

According to embodiments of the present disclosure, the image source further comprises a magnifying element, and the magnifying element is disposed between the display unit and the transmission and reflection element and is configured to magnify an image generated by the display unit.

According to embodiments of the present disclosure, every one of the plurality of transmission and reflection units of the transmission and reflection element has a greater area than at least one of the plurality of pixels of the display unit corresponding to the one of the plurality of transmission and reflection units.

According to embodiments of the present disclosure, the projector further comprises: a receiving screen configured to receive the image light transmitted or reflected by the transmission and reflection element to display an image.

According to embodiments of the present disclosure, each of the plurality of transmission and reflection units comprises a first electrode, a second electrode, a transmission and reflection layer disposed between the first electrode and the second electrode, and an electrolyte layer and an ion storage layer which are disposed between the transmission and reflection layer and the first electrode, the transmission and reflection layer comprises a reflective transition metal oxide, and the transmission and reflection units of the transmission and reflection element are configured to switch between the transmissive state and the reflective state under the control of an external voltage.

Embodiments of the present disclosure provide a method of driving a projector, the projector comprising: an image source comprising a display unit, the display unit comprising a plurality of pixels; and a transmission and reflection element comprising a plurality of transmission and reflection units, wherein each of the transmission and reflection units has a reflective state and a transmissive state, and the plurality of transmission and reflection units of the transmission and reflection element are disposed on paths of lights emitted by the plurality of pixels of the display unit, the method comprising: driving some of the plurality of pixels of the display unit into a closed state and driving the others into an open state; and driving some of the plurality of transmission and reflection units of the transmission and reflection element into the reflective state and driving the others into the transmissive state, wherein while driving some of the plurality of pixels into the closed state, at least one of the plurality of transmission and reflection units which corresponds to the driven pixels is driven into the transmissive state; or wherein while driving some of the plurality of pixels into the closed state, the at least one of the plurality of transmission and reflection units which corresponds to the driven pixels is driven into the reflective state.

According to embodiments of the present disclosure, the plurality of transmission and reflection units of the transmission and reflection element are in a one-to-one correspondence with the plurality of pixels of the display unit.

According to embodiments of the present disclosure, the at least one of the plurality of transmission and reflection units transmits or reflects an image light emitted by the driven pixels and irradiated on the at least one of the plurality of transmission and reflection units, so that the image light is not projected and displayed.

According to embodiments of the present disclosure, the transmission and reflection unit comprises an electrochromic unit.

According to embodiments of the present disclosure, the pixels driven into the closed state are pixels having a gray scale value of zero.

BRIEF DESCRIPTION OF THE DRAWINGS

In order to describe technical solutions according to embodiments of the present disclosure more clearly, accompanying drawings of the embodiments will be simply explained as below. Apparently, the accompanying drawings mentioned hereinafter relate to only some of the embodiments of the present disclosure and the present disclosure should not be construed as being limited to the accompanying drawings.

DETAILED DESCRIPTION OF THE EMBODIMENTS

In order that the above and other objects, advantages, and features of embodiments of the present disclosure become more apparent and are more readily appreciated, a clear and complete description of the technical solutions in the embodiments will be made as below with reference to examples of the present disclosure taken in conjunction with the accompanying drawings. Apparently, the described embodiments are some of the embodiments of the present disclosure rather than all of the embodiments of the present disclosure. All other embodiments derived by those skilled in the art based on the following embodiments of the present disclosure without making a creative work shall fall within the protection scope of the present disclosure.

A projector and a method of driving the projector will be described in detail as below with reference to the embodiments of the present disclosure taken in conjunction with the accompanying drawings.

Figure 1A:
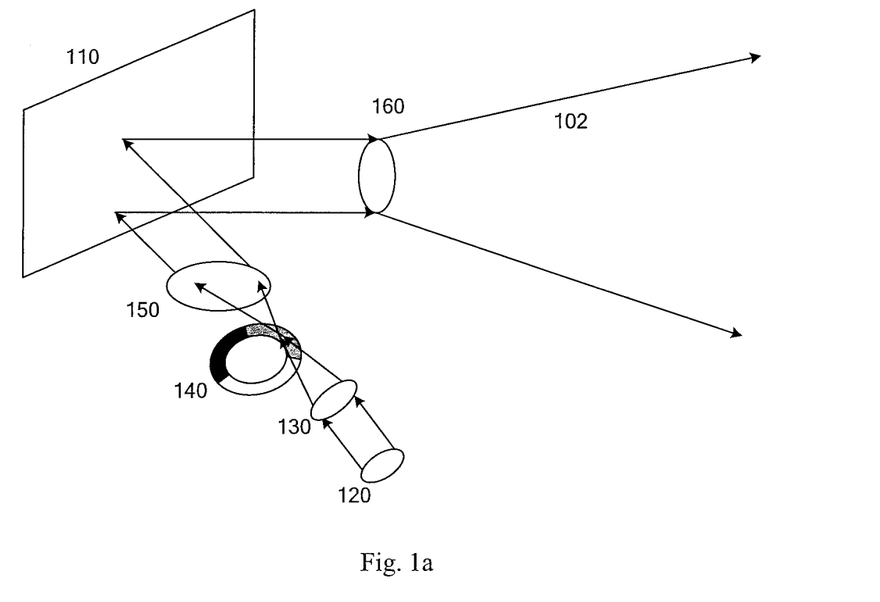
FIG. 1a is a schematic diagram illustrating an operational principle of an image source according to an embodiment of the present disclosure.

FIG. 1a is a schematic diagram illustrating an operational principle of an image source 100 of a projector, operating in a digital light processing (DLP) mode, according to an embodiment of the present disclosure. Light from a light source 120 is homogenized through a condenser lens 130, and is then irradiated onto a color wheel 140. For example, the light passing through the color wheel 140 may be formed into one of red light, green light, and blue light. Of course, the light passing through the color wheel 140 may be formed into light having any other color. After passing through the color wheel 140, the light is projected onto a display unit 110 through a shaping optical module 150. After receiving a control signal from a control board, the display unit 110 reflects the light onto the magnifying element 160. The light exits from the magnifying element 160 to form an image light (an outgoing light) 102. Finally, the image light (the outgoing light) 102 is projected onto a screen to form a magnified image. The magnifying element 160 may play a magnifying role and may be used to magnify an image formed by the display unit. For example, the magnifying element may be a projection lens.

Each pixel of the display unit 110 may be controlled to be in a projection state or in a non-projection state. The pixels 1111 controlled to be in the projection state are in an open state. The pixels 1111 in the open state are pixels 1111 having a nonzero gray scale value. Light, such as color light, projected on the pixels of the display unit 110 is reflected by the pixels onto the magnifying element 160. The pixels 1112 controlled to be in the non-projection state are in a closed state. The pixels 1112 in the closed state are pixels 1112 having a gray scale value of zero. The pixels 1112 in the closed state project no light onto the magnifying element 160, thereby displaying a black color.

For example, the display unit 110 may be a digital micromirror device (DMD). The digital micromirror device may comprise a plurality of digital micromirror units constituting a plurality of pixels. Each of the pixels may be independently controlled to be opened and closed. For example, whether or not the pixel of the digital micromirror device reflects light may be controlled by adjusting an angle of the pixel, so that the pixel is brought into a displaying state or a closed state. For example, when the digital micromirror units or the pixels reflect light, they are in the displaying state, but when the digital micromirror units or the pixels do not reflect light, they are in the closed state and display a black color.

It was found by the inventors of the present application during research that there is a problem of a low contrast in common projectors for the following two main reasons. On one hand, ambient light is irradiated on a display screen, so that a black portion displayed on the display screen appears not to be completely black. In other words, the black display is not pure enough. On the other hand, light will leak out from the pixels of the display unit even when the pixels are closed, so that a black portion displayed on the display unit is not really black.

Figure 1B:
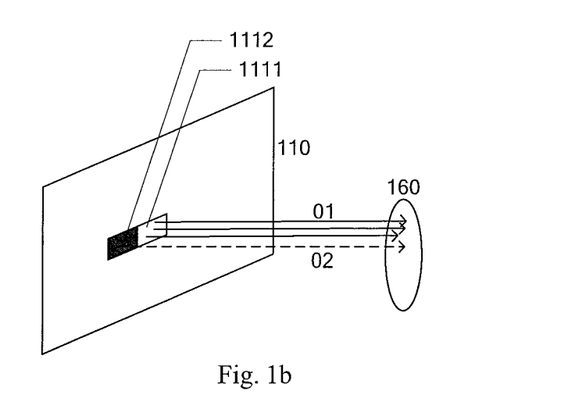
FIG. 1b is a schematic diagram illustrating the image source generating an image light comprising a bright-state region image light and a dark-state region image light.

Since the light will leak out from the pixels of the display unit even when the pixels are closed, the image light may comprise a bright-state region image light 01 and a dark-state region image light 02 as shown in FIG. 1b. For example, the bright-state region image light 01 may be emitted by pixels 1111 of the display unit which have a nonzero gray scale value, while the dark-state region image light 02 may be emitted by pixels 1112 of the display unit which have a gray scale value of zero. For example, the bright-state region image light 01 may be image light which will be transmitted or reflected to be projected and displayed, while the dark-state region image light 02 may be image light emitted by pixels which have a gray scale value of 0. For example, the dark-state region image light may correspond to the pixels of the display unit which are in the closed state. For example, the bright-state region image light may correspond to the pixels of the display unit which have a nonzero gray scale value. The number of the pixels to which the bright-state region image light 01 correspond is not limited to that shown in FIG. 1b, while the number of the pixels to which the dark-state region image light 02 correspond is not limited to that shown in FIG. 1b. A plurality of pixels of the display unit may be controlled to be opened or closed or to have a nonzero gray scale value or a gray scale value of zero according to requirements at different times, for emitting the bright-state region image light 01 or the dark-state region image light 02 accordingly.

Embodiments of the present disclosure provide a projector comprising an image source and a transmission and reflection element. The image source is configured to generate an image light and emit the image light. The image light comprises a bright-state region image light and a dark-state region image light. The transmission and reflection element comprises a plurality of transmission and reflection units. Each of the transmission and reflection units has a reflective state and a transmissive state. Each of the transmission and reflection units is configured to reflect the image light irradiated thereon when in the reflective state, and to transmit the image light irradiated thereon when in the transmissive state. The transmission and reflection element is disposed on a light output side of the image source, and is configured to perform one of a transmission and a reflection on the bright-state region image light so that the bright-state region image light is projected and displayed, and to perform the other of the transmission and the reflection on the dark-state region image light so that the dark-state region image light is not projected and displayed. The image light (including leaked light) of at least one, which is in the closed state, of the pixels of the display unit of the image source can be transmitted or reflected by the transmission and reflection unit, so that the image light (including leaked light) is not used for displaying an image. Hence, with the projector, the problem of an impure black picture caused by light leakage of the display unit can be solved, a contrast of the entire picture is increased, and a picture displaying effect is improved. Thereby, a projector having a high contrast can be obtained. For example, when the projector performs a reflective projection display, a part of the image light (the dark-state region image light) is transmitted by the transmission and reflection units, so that a black picture is displayed; and when the projector performs a transmissive projection display, a part of the image light (the dark-state region image light) is reflected by the transmission and reflection units, so that a black picture is displayed, thereby avoiding light leakage. For example, the bright-state region image light has a greater brightness than the dark-state region image light.

For example, at least one of the plurality of transmission and reflection units is in the transmissive state, or at least one of the plurality of transmission and reflection units is in the reflective state, and the at least one transmission and reflection unit in the transmissive state or the at least one transmission and reflection unit in the reflective state is configured to correspond to at least one, which is in the closed state, of the plurality of pixels of the display unit.

Figure 2:
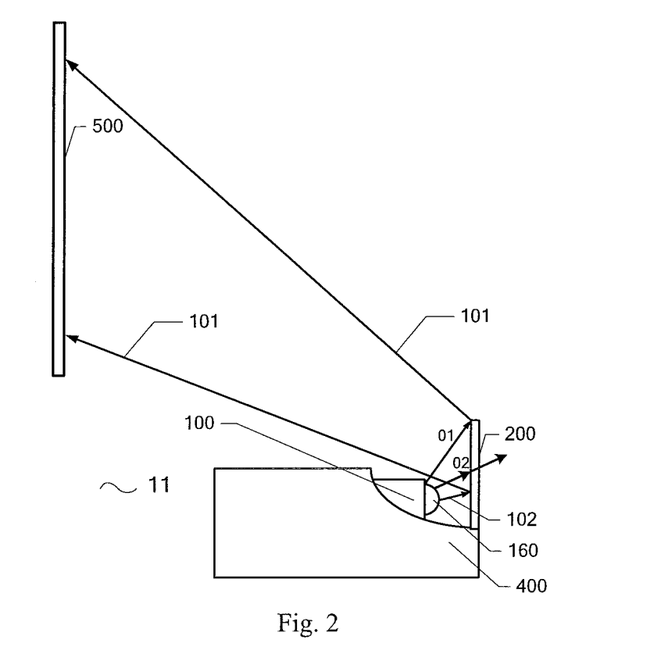
FIG. 2 is a schematic diagram of a reflective projector according to an embodiment of the present disclosure.

As shown in FIG. 2, embodiments of the present disclosure provide a projector which is a reflective projector 11. The projector comprises an image source 100 and a transmission and reflection element 200.

In an embodiment of the present disclosure, as shown in FIG. 2, the image source 100 is configured to generate an image light 102 and emit the image light 102. The image light 102 may comprise a bright-state region image light 01 and a dark-state region image light 02 (which may also be those shown in FIG. 1b). The transmission and reflection element 200 is disposed on a light output side of the image source 100, and is configured to reflect the image light 102 emitted by the image source 100, thereby displaying an image. For example, as indicated by a light path shown in FIG. 2, the transmission and reflection element 200 is configured to perform the reflection on the bright-state region image light 01 so that the bright-state region image light is projected and displayed, and to perform the transmission on the dark-state region image light 02 so that the dark-state region image light is not projected and displayed.

By providing the transmission and reflection element 200, light leaked out from the pixels which need to display a black portion of an image can be transmitted by the transmission and reflection element 200, so that a black display is purer and light leakage can be avoided or reduced. With the projector, the problem of an impure black picture caused by light leakage of the display unit can be solved, a contrast of the entire picture is increased, and a picture displaying effect is improved.

In an embodiment of the present disclosure, as shown in FIG. 2, the projector may further comprise a receiving screen 500. The receiving screen 500 is configured to receive the image light reflected by the transmission and reflection element 200 to display an image. In other words, the reflected light 101 is protected onto the receiving screen 500 to display an image. For example, as shown in FIG. 2, the projector may further comprise a support 400 on which the image source 100 and the transmission and reflection element 200 may be disposed. For example, the image light is light that can form an image by being projected.

Figure 3:
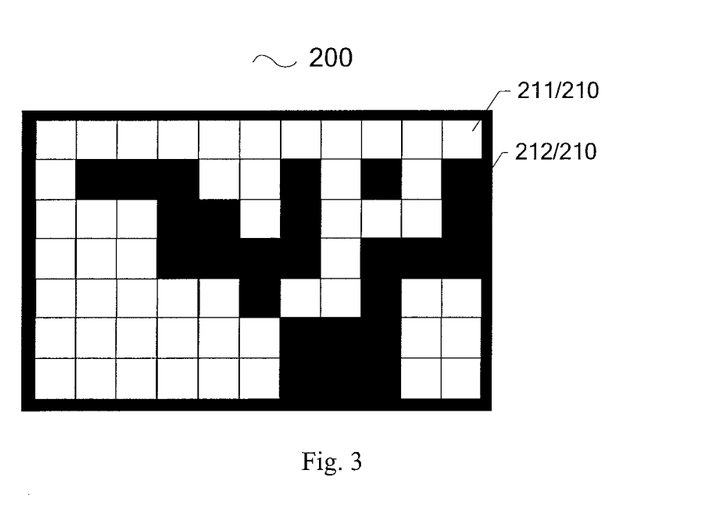
FIG. 3 is a schematic diagram of a plurality of transmission and reflection units of a transmission and reflection element according to the embodiment of the present disclosure.

As shown in FIG. 3, the transmission and reflection element 200 may comprise a plurality of transmission and reflection units 210. Each of the transmission and reflection units 210 may assume two states, i.e. a reflective state and a transmissive state. The transmission and reflection units 210 can switch between the reflective state and the transmissive state. Each of the transmission and reflection units 210 is configured to reflect the image light 102, emitted by the image source 100 and irradiated on it, when it is in the reflective state, and to transmit the image light 102, emitted by the image source 100 and irradiated on it, when it is in the transmissive state. In other words, each of the transmission and reflection units is configured to reflect the image light irradiated thereon when it is in the reflective state, and to transmit the image light irradiated thereon when it is in the transmissive state.

In embodiments of the present disclosure, each of the transmission and reflection units 210 may be independently controllable. All or most of light irradiated onto one of the transmission and reflection units 210 is reflected when the one of the transmission and reflection units 210 is in the reflective state, while all or most of light irradiated onto one of the transmission and reflection units 210 is transmitted when the one of the transmission and reflection units 210 is in the transmissive state. For example, when an image is displayed, the transmission and reflection units 200 may be divided into reflective-state transmission and reflection units 211 (transmission and reflection units 211 which are in the reflective state) and transmission-state transmission and reflection units 212 (transmission and reflection units 212 which are in the transmissive state) according to whether they are in the reflective state or in the transmissive state. The reflective-state transmission and reflection units 211 reflect the image light emitted by the image source 100, and the transmission-state transmission and reflection units 212 transmit the image light emitted by the image source 100. For example, as shown in FIG. 3, the plurality of transmission and reflection units 210 are arranged in an array as a whole. However, the arrangement of the plurality of transmission and reflection units 210 is not limited to the array arrangement.

Figure 4:
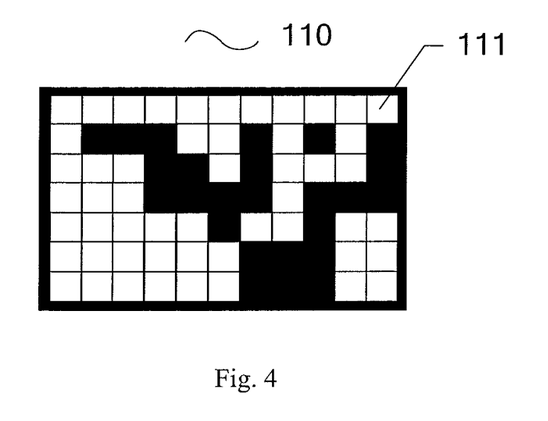
FIG. 4 is a schematic diagram of a display unit according to the embodiment of the present disclosure.

In embodiments of the present disclosure, the image source 100 may comprise a display unit 110. As shown in FIG. 4, the display unit 110 may comprise a plurality of pixels 111. For example, each of the plurality of pixels 111 of the display unit 110 may be controlled to be in an open state or in a closed state. The pixels 1111 in the open state reflect light, projected on them, onto the receiving screen 500. The pixels 111 in the closed state theoretically project no light onto the receiving screen 500, thereby displaying a black color. However, in practical application, light will leak out from the pixels 111 of the display unit 110 when the pixels 111 are closed, so that a black portion displayed on the display unit is not really black. Therefore, the transmission and reflection element 200 is disposed in the present embodiment.

In embodiments of the present disclosure, one of the plurality of transmission and reflection units which is in the transmissive state corresponds to at least one of the plurality of pixels which is in the closed state. As a result, a display contrast can be increased to a certain degree. For example, in order to increase the display contrast to a certain degree, one of the plurality of transmission and reflection units 210 of the transmission and reflection element 200 may correspond to at least one of the plurality of pixels 111 of the display unit 110. However, the present disclosure is not limited to this. For example, an image light emitted by every one of the plurality of pixels of the display unit is irradiated on one of the transmission and reflection units corresponding to the one of the plurality of pixels. For example, if one or more of the plurality of pixels 111, corresponding to one of the plurality of transmission and reflection units 210, of the display unit 110 are in the open state, the one of the plurality of transmission and reflection units 210 needs to be in the reflective state, thereby not adversely affecting a display. Only if one or more of the plurality of pixels 111 corresponding to one of the plurality of transmission and reflection units 210 are each in the closed state, the one of the plurality of transmission and reflection units 210 is in the transmissive state, so that light leaked out from the one or more pixels in the closed state is not used for displaying an image, thereby increasing a contrast. One transmission and reflection unit 210 of the transmission and reflection element 200 corresponding to three pixels 111 of the display unit 110 is taken as an example. The one transmission and reflection unit 210 corresponding to three pixels 111 needs to be in the reflective state as long as one of the three pixels 111 of the display unit 110 is in the open state. Only if all of the three pixels 111 corresponding to the one transmission and reflection unit 210 are in the closed state, the one transmission and reflection unit 210 is in the transmissive state.

In the present embodiment, the correspondence between the transmission and reflection units 210 and the pixels 111 of the display unit 110 means that there is a correspondence between them in light path. For example, the correspondence between the transmission and reflection units of the transmission and reflection element and the pixels of the display unit means that the transmission and reflection units of the transmission and reflection element are located on light paths of lights emitted by the pixels of the display unit. For example, the plurality of transmission and reflection units of the transmission and reflection element are disposed on paths of lights emitted by the plurality of pixels of the display unit. For example, the image source further comprises a magnifying element, and the magnifying element is disposed between the display unit and the transmission and reflection element and is configured to magnify an image generated by the display unit. Furthermore, every one of the plurality of transmission and reflection units of the transmission and reflection element has a greater area than at least one of the plurality of pixels, corresponding to the one of the plurality of transmission and reflection units, of the display unit. For example, the magnifying element comprises a projection lens.

In embodiments of the present disclosure, in order to increase the display contrast better, one of the plurality of pixels 111 of the display unit 110 corresponds to at least one of the plurality of transmission and reflection units 210 of the transmission and reflection element 200, so that the problem of light leakage of the display unit can be better solved. For example, one of the plurality of transmission and reflection units 210 of the transmission and reflection element 200 corresponds to one of the plurality of pixels 111 of the display unit 110. In other words, the plurality of transmission and reflection units 210 of the transmission and reflection element 200 are in a one-to-one correspondence with the plurality of pixels 111 of the display unit 110, so that the transmission and reflection element and the display unit have the same resolution and a better contrast improving effect can be achieved.

In embodiments of the present disclosure, one of the plurality of pixels 111 of the display unit 110 corresponding to one of the plurality of transmission and reflection units 210 of the transmission and reflection element 200 is taken as an example. The plurality of pixels 111 of the image source 100 may be controlled such that some of them are in the open state and the others are in the closed state. The pixels 111 controlled to be in the open state correspond to the reflective-state transmission and reflection units 211 of the transmission and reflection element 200, and an image light (the bright-state region image light 01) reflected by the pixels 111 controlled to be in the open state is projected onto the reflective-state transmission and reflection units 211 of the transmission and reflection element 200, and then is reflected by the reflective-state transmission and reflection units 211 onto the receiving screen 500, so that the image light is projected and displayed after being reflected. The pixels 111 of the image source 100 which are controlled to be in the closed state correspond to the transmission-state transmission and reflection units 212 of the transmission and reflection element 200. An image light (the dark-state region image light 02) projected onto the transmission and reflection element due to light leakage is correspondingly irradiated onto the transmission-state transmission and reflection units 212 and thus is transmitted, so that the pixels 111 controlled to be in the closed state will project no light onto the receiving screen 500, thereby displaying a black color. As a result, the display contrast can be increased.

Figure 5:
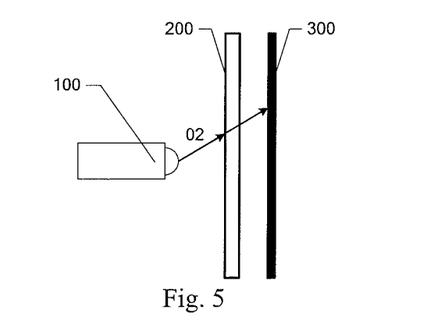
FIG. 5 is a schematic diagram of the projector, comprising a light absorbing layer, according to the embodiment of the present disclosure.

In an embodiment of the present disclosure, as shown in FIG. 5, the reflective projector 11 further comprises a light absorbing layer 300. The light absorbing layer 300 is disposed on a side of the transmission and reflection element 200 away from the image source 100, and is configured to absorb the image light transmitted by the transmission and reflection element 200. After being irradiated onto the transmission-state transmission and reflection units 212 of the transmission and reflection element 200, the image light is transmitted by the transmission and reflection element 200 and is absorbed by the light absorbing layer 300. As a result, a better user experience can be obtained. For example, the light absorbing layer 300 may be made of a black light absorbing material. For example, the light absorbing layer 300 is made of a material such as a carbon nanotube, a carbon nanosphere, a graphene, a carbon black or a matte ink. However, material for the light absorbing layer is not limited to those described in the embodiments. For example, the light absorbing layer 300 may be disposed on a side of a substrate of the transmission and reflection element 200 away from the image source 100. However, arrangement of the light absorbing layer 300 is not limited to this.

In embodiments of the present disclosure, the image source 100 may comprise a high-brightness light source. For example, the high-brightness light source is a laser, a metal halogen lamp or a cold light source. However, the light source of the image source 100 is not limited to those described in the embodiments. For example, the image source 100 may further comprise a control circuit, a radiator, and the like. For example, the image source 100 may further comprise a magnifying element 160 (referring to FIG. 2). The magnifying element 160 may be disposed at a front end of the image source 100 of the reflective projector 11 and is configured to magnify a received small picture and then images the amplified picture on the receiving screen 500, thereby forming a uniform clear projection picture.

In embodiments of the present disclosure, a projection lens of the reflective projector 11 may be an ultrashort-focal length lens. For example, the projection lens of the reflective projector 11 may be a mirror lens or a reflex lens. However, the projection lens of the reflective projector 11 is not limited to those described in the embodiments. The projector with the ultrashort-focal length lens can have a relatively small throw ratio which is equal to a ratio of a projection distance to a width of a projected picture. If the projection distance is the same, the smaller the throw ratio is, the bigger the width of the projected picture is, i.e. the bigger the projected picture is. For example, the throw ratio of the projector with the ultrashort-focal length lens may be less than 0.4. However, the throw ratio of the projector with the ultrashort-focal length lens is not limited to this. The projector with the ultrashort-focal length lens may be placed adjacent to the receiving screen. Therefore, it is not necessary to worry whether a speaker will block an image light projected onto the receiving screen.

Figure 6A:
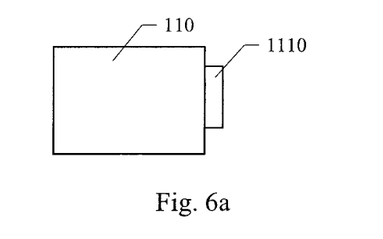
FIG. 6a is a schematic diagram showing a display unit and a first control unit of the projector according to the embodiment of the present disclosure.
Figure 6B:
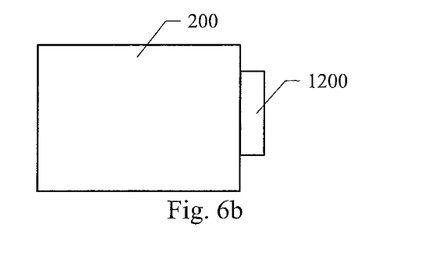
FIG. 6b is a schematic diagram showing a transmission and reflection element and a second control unit of the projector according to the embodiment of the present disclosure.

In an embodiment of the present disclosure, as shown in FIG. 6a and FIG. 6b, the projector further comprises a first control unit 1110 and a second control unit 1200. The first control unit 1110 is configured to control each of the plurality of pixels 111 to be in an open state or in a closed state, and the second control unit 1200 is configured to control each of the plurality of transmission and reflection units 210 to be in the reflective state or in the transmissive state. The first control unit 1110 and the second control unit 1200 are further configured to control at least one of the plurality of transmission and reflection units 210 to be in the transmissive state when at least one of the plurality of pixels 111 corresponding to the at least one of the plurality of transmission and reflection units 210 is in the closed state, or the first control unit 1110 and the second control unit 1200 are further configured to control at least one of the plurality of transmission and reflection units 210 to be in the reflective state when at least one of the plurality of pixels 111 corresponding to the at least one of the plurality of transmission and reflection units 210 is in the closed state. For example, each of the plurality of pixels may be independently controllable, for example by the first control unit 1110. For example, each of the plurality of transmission and reflection units 210 may be independently controllable, for example by the second control unit 1200.

Figure 7:
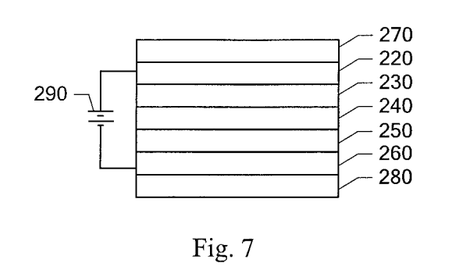
FIG. 7 is a schematic diagram showing a layer structure of a transmission and reflection element (an electrochromic element) of the projector according to the embodiment of the present disclosure.

In embodiments of the present disclosure, the transmission and reflection element 200 may be an electrochromic element, for example an electrochromic mirror. However, the transmission and reflection element is not limited to those described in the embodiments. For example, the transmission and reflection element 200 comprises a transmission and reflection layer 230 which may be an electrochromic layer. For example, the electrochromic element may steadily and reversibly vary in color or transparency under the action of an external electric field having a lower intensity. In other words, an electrochromic material in the electrochromic element reversibly varies in valence state and component, so that properties of the electrochromic element, such as reflectivity and transmissivity, are changed.

In an embodiment of the present disclosure, as shown in FIG. 7, the transmission and reflection element 200 comprises a first electrode 220, a second electrode 260, and a transmission and reflection layer 230 disposed between the first electrode 220 and the second electrode 260. The transmission and reflection layer 230 can switch between the reflective state and the transmissive state (a transparent state), and has steady-state property. In other words, after the transmission and reflection layer 230 switches to one of the reflective state and the transmissive state, it is no longer necessary to use additional electric power to maintain the transmission and reflection layer 230 in the one of the reflective state and the transmissive state. Furthermore, the transmission and reflection layer 230 may have a reflectivity in the range of 80%-100% when in the reflective state, and the transmission and reflection layer 230 may have a transmittance in the range of 80%-100% when in the transmissive state.

In embodiments of the present disclosure, materials for the first electrode 220 and the second electrode 260 of the electrochromic element may be a transparent conductive material such as indium tin oxide or indium zinc oxide. However, the materials for the first electrode 220 and the second electrode 260 are not limited to those described in the embodiments.

In embodiments of the present disclosure, the transmission and reflection element 200 (the electrochromic element) may further comprise an electrolyte layer 240 and an ion storage layer 250 which are disposed between the transmission and reflection layer 230 and the second electrode 260. It is to be noted that the first electrode 220 and the second electrode 260 may be exchanged and their arrangements are not limited to those described in the embodiments.

In embodiments of the present disclosure, the transmission and reflection element 200 further comprises a first substrate 270 and a second substrate 280. For example, materials for the first substrate 270 and the second substrate 280 may be a hard transparent material such as transparent glass and quartz, or a soft transparent material such as plastic. The materials for the first substrate 270 and the second substrate 280 are not limited to those described in the embodiments.

In embodiments of the present disclosure, the first electrode 220, the transmission and reflection layer 230 (which may be an electrochromic layer), the electrolyte layer 240, the ion storage layer 250 and the second electrode 260 may be disposed between the first substrate 270 and the second substrate 280 in sequence. Under the action of an external voltage applied by a power source 290, ions are injected by the ion storage layer 250 into the electrolyte layer 240, and then the electrolyte layer 240 supplies the ions to the transmission and reflection layer 230 (an electrochromic layer), so that a reversible oxidation or reduction occurs in the transmission and reflection layer 230. As a result, a material for the transmission and reflection layer 230 changes in energy level, thereby varying in color.

In embodiments of the present disclosure, the transmission and reflection layer 230 may comprise a reflective transition metal oxide, but is not limited to this. For example, the transmission and reflection layer 230 is a layer that is switchable between the transparent state and the reflective state. The material for the electrochromic layer steadily and reversibly varies in optical property such as reflectivity, transmittance, and absorptivity under the action of an external electric field. Thereby, the material for the electrochromic layer varies in color. This variation assumes a reversible variation in color and transparency in appearance. A material having electrochromic characteristic may be called as an electrochromic material. For example, the electrochromic material can be oxidized or reduced under the action of an electric field, so that the energy level of the material is changed, thereby varying in optical property. For example, the transmission and reflection units are switchable between the transmissive state and the reflective state under the control of an external voltage. For example, the transition metal oxide of the transmission and reflection layer 230 is in the reflective state when in a natural state. After a voltage or current is applied to the ion storage layer 250 and the transmission and reflection layer 230, some of ions existing in the ion storage layer 250 are transferred to the transmission and reflection layer 230 through the electrolyte layer 240. Since these ions are injected into the transmission and reflection layer 230, the transmission and reflection layer 230 is switched into a substantially transmissive (transparent) state. When the applied current or voltage is reversed, the ions are returned to the ion storage layer 250, so that the transmission and reflection layer 230 is switched into a substantially reflective state again. In addition, after the transfer or return of the ions has been completed, it no longer needs an additional voltage or current to maintain the substantially transmissive (transparent) state or the substantially reflective state of the transmission and reflection layer 230. Generally, a switching time of the transmission and reflection layer 230 for switching between the transmissive state and the reflective state is in the range of 50 ms-2000 ms, and a switching voltage of the transmission and reflection layer 230 for switching between the transmissive state and the reflective state is in the range of 0.25 V-3.0 V. Of course, the transmission and reflection layer 230 may also be made of other substances. The other substances are in the transmissive state when in the natural state, and they are switchable between the transmissive state and the reflective state under the control of an external voltage. The transmission and reflection layer 230 is not limited to those described in the embodiments.

In embodiments of the present disclosure, the transmission and reflection layer 230 may be made of printable electrochromic ink, electrochromic film, electrochromic glass, electrically controlled light-transmission film, or the like. A material for the transmission and reflection layer 230 may be an inorganic material, or an organic material. For example, the inorganic material may be tungsten trioxide, vanadic oxide, nickel oxide and the like, while the organic material may be polythiophene and its derivatives, viologen, tetrathiafulvalene, metal phthalocyanine compounds, and the like. However, the material for the transmission and reflection layer 230 is not limited to those described in the embodiments.

In embodiments of the present disclosure, the electrolyte layer 240 is made of electrolyte. For example, the electrolyte may be solid electrolyte or conducting solution of tantalum pentoxide or lithium perchlorate, or the like. However, the material for the electrolyte layer 240 is not limited to those described in the embodiments.

In embodiments of the present disclosure, the ion storage layer 250 can store returned ions when an oxidation-reduction reaction occurs in the transmission and reflection layer 230, thereby maintaining charge balance of the transmission and reflection element 200 as a whole. For example, a material for the ion storage layer 250 may comprise nickel protoxide. Furthermore, the ion storage layer 250 may also be made of a variable color material and may produce a color which, together with a color of the transmission and reflection layer 230, constitutes complementary colors or additive colors.

In embodiments of the present disclosure, because of the limitation of a speed, i.e. a response speed, at which the transmission and reflection layer 230 is controlled to switch between the two states, the reflective projector 11 according to the present embodiment is suitable for an application field in which pictures are not switched rapidly. For example, the reflective projector 11 is applicable to a work report projected in an office, and the like.

Figure 8:
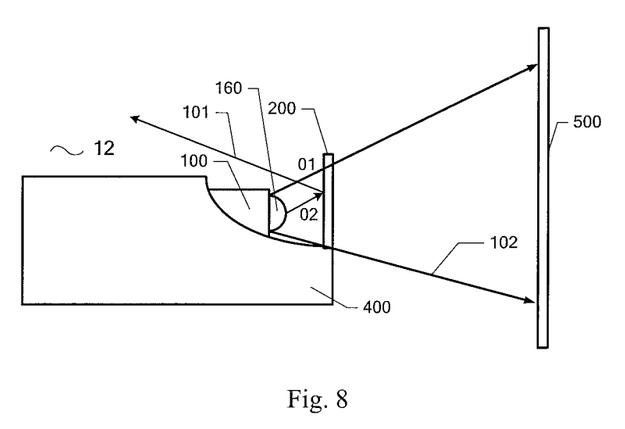
FIG. 8 is a schematic diagram of a direct projection type projector according to a further embodiment of the present disclosure.

A projector according to an embodiment shown in FIG. 8 is a direct projection type projector 12 which is different from that according to the embodiment shown in FIGS. 2-7. Some, in the transmissive state, of the transmission and reflection units of the transmission and reflection element 200 in the direct projection type projector 12 are configured to transmit the image light irradiated on them, so that the image light is projected and displayed after being transmitted, while the others, in the reflective state, of the transmission and reflection units of the transmission and reflection element 200 are configured to reflect the image light irradiated on them. In other words, each of the transmission and reflection units is configured to reflect the image light irradiated on it when in the reflective state, and to transmit the image light irradiated on it when in the transmissive state.

The transmission and reflection element 200 is configured to transmit the image light 102 emitted by the image source 100, thereby displaying an image. For example, as indicated by a light path shown in FIG. 8, the transmission and reflection element 200 is configured to perform the transmission on the bright-state region image light 01 so that the bright-state region image light is projected and displayed, and to perform the reflection on the dark-state region image light 02 so that the dark-state region image light is not projected and displayed. For example, one of the plurality of transmission and reflection units which is in the reflective state corresponds to at least one of the plurality of pixels which is in the closed state, to reflect light leaked out from the at least one of the pixels which is in the closed state, thereby improving a displaying effect and obtaining a high-contrast projector.

In embodiments of the present disclosure, some, controlled to be in the closed state, of the plurality of pixels 111 in the image source 100 correspond to the reflective-state transmission and reflection units 211 of the transmission and reflection element 200, so that light leaked out from the pixels which are in the closed state is reflected and thus will not be projected onto the receiving screen 500, thereby displaying a black color and increasing a contrast.

Likewise, with the projector having the transmission and reflection element 200, the problem of an impure black picture caused by light leakage of the display unit can be solved, a contrast of the entire picture is increased, and a picture displaying effect is improved.

As shown in FIG. 8, the image source 100 is configured to generate an image light 102 and emit the image light 102. Most of the image light 102 (i.e. an outgoing light) is not changed in direction after passing through the transmission and reflection element 200. In other words, most of the image light 102 is projected directly onto the receiving screen 500 after being transmitted by the transmission and reflection element 200, to display an image. The reflected light 101 is a small portion of the image light 102 or the outgoing light, namely, the dark-state region image light 02 including leaked light. The reflected light 101 is reflected by the transmission and reflection element 102 and is not projected onto the receiving screen 500.

In embodiments of the present disclosure, a projection lens of the direct projection type projector 12 may be a long-focal length lens. For example, the throw ratio of the projector with the long-focal length lens may be greater than 3. However, the throw ratio of the projector with the long-focal length lens is not limited to this. The projector with the long-focal length lens may be placed at a distance of 3 m or more from the receiving screen. The projector may be placed behind or above viewer.

In contrast with the projector according to the embodiment shown in FIGS. 2-7, in the projector according to the embodiment shown in FIG. 8, no light absorbing layer is disposed on a side of the transmission and reflection element 200 away from the image source 100, and the image light is projected by the transmissive-state transmission and reflection units 212 of the transmission and reflection element 200 onto the receiving screen 500 after being transmitted by the transmissive-state transmission and reflection units 212, while light leaked out from the pixels 111 of the display unit 110 is reflected by the reflective-state transmission and reflection units 211 of the transmission and reflection element 200 so that it cannot be projected onto the receiving screen 500. As a result, the problem of an impure black picture caused by light leakage of the display unit 110 is solved, a contrast of the entire picture is increased, and a picture displaying effect is improved.

Figure 9:
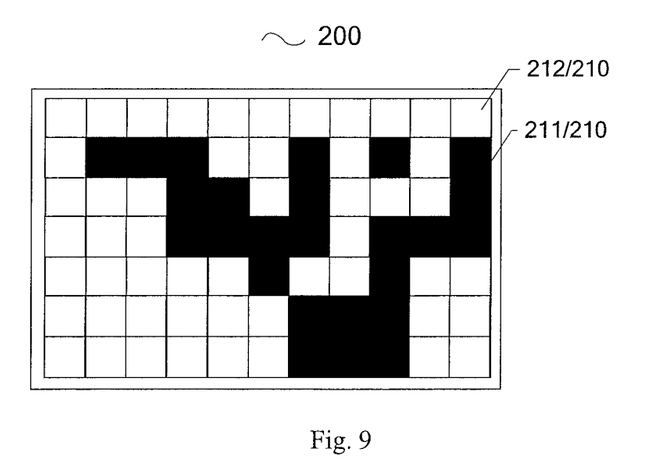
FIG. 9 is a schematic diagram of a plurality of transmission and reflection units of a transmission and reflection element of the direct projection type projector according to the further embodiment of the present disclosure.

The plurality of transmission and reflection units 210 of the transmission and reflection element 200 according to the present embodiment may be those shown in FIG. 9. For example, when the transmission and reflection elements 200 shown in FIGS. 3 and 9 are configured for displaying the same picture, the reflective-state transmission and reflection units 211 and the transmission-state transmission and reflection units 212 of the transmission and reflection element 200 shown in FIG. 3 correspond in position to the transmission-state transmission and reflection units 212 and the reflective-state transmission and reflection units 211 of the transmission and reflection element 200 shown in FIG. 9.

The description of the embodiments shown in FIGS. 2-7 may be referred to for the remaining contents of the embodiment shown in FIG. 8, and they are no longer described herein for the sake of brevity.

The projector according to the embodiments of the present disclosure is not limited to a projector operating in a digital light processing (DLP) mode, and may also comprise projectors operating in other modes. For example, the projector according to the embodiments of the present disclosure may further comprise a projector operating in a liquid crystal display (LCD) mode, and the like.

The transmission and reflection units of the transmission and reflection element according to the embodiment of the present disclosure are not limited to those shown in the figures. The transmission-state transmission and reflection units and the reflective-state transmission and reflection units may be changed in state according to displaying requirements.

The transmission and reflection element according to the embodiment of the present disclosure is not limited to the electrochromic element. For example, the transmission and reflection element according to the embodiment of present disclosure may also be achieved by other structures that enable the transmission and reflection units to switch between the transmissive state and the reflective state.

A method of driving a projector according to embodiments of the present disclosure will be described in detail as below.

Embodiments of the present disclosure provide a method of driving a projector, the projector comprising:

an image source comprising a display unit, the display unit comprising a plurality of pixels; and a transmission and reflection element comprising a plurality of transmission and reflection units, wherein each of the transmission and reflection units has a reflective state and a transmissive state, and the plurality of transmission and reflection units of the transmission and reflection element are disposed on paths of lights emitted by the plurality of pixels of the display unit, the method comprising:

driving some of the plurality of pixels of the display unit into a closed state and driving the others of the plurality of pixels into an open state; and driving some of the plurality of transmission and reflection units of the transmission and reflection element into the reflective state and driving the others of the plurality of transmission and reflection units into the transmissive state, wherein while driving some of the plurality of pixels into the closed state, at least one of the plurality of transmission and reflection units which corresponds to the driven pixels is driven into the transmissive state; or wherein while driving some of the plurality of pixels into the closed state, the at least one of the plurality of transmission and reflection units which corresponds to the driven pixels is driven into the reflective state.

In embodiments of the present disclosure, the plurality of transmission and reflection units of the transmission and reflection element are in a one-to-one correspondence with the plurality of pixels of the display unit.

In embodiments of the present disclosure, the at least one of the plurality of transmission and reflection units transmits or reflects an image light emitted by the driven pixels and irradiated on the at least one of the plurality of transmission and reflection units, so that the image light is not projected and displayed. For example, the pixels driven into the closed state are pixels having a gray scale value of zero.

For example, the method of driving a projector according to the present embodiment may be used to drive the projector according to any one of the above embodiments.

In embodiments of the present disclosure, the control unit may be achieved by one or more logic operation processing circuits which may comprise: a processor such as a central processing unit (CPU), an application specific integrated circuit (ASIC), a digital signal processor (DSP), a field programmable gate array (FPGA), a single-chip microcomputer, and the like.

It is to be noted that:

(1) the same element is indicated by the same reference sign in the embodiments and the drawings unless otherwise defined;

(2) only structures and configurations relating to the embodiments of the present disclosure are shown in the drawings of the embodiments of the present disclosure, and common designs may be referred to for other structures and configurations;

(3) thickness of a layer or region is enlarged in the drawings of the embodiments of the present disclosure for the purpose of clarity; and (4) the features in the same embodiment of the present disclosure may be combined with each other unless they conflict and the features in the different embodiments of the present disclosure may be combined with each other unless they conflict.

The above embodiments are only used to explain the present invention, and should not be construed to limit the present invention. It will be appreciated by those skilled in the art that various changes and modifications may be made therein without departing from the spirit of the present invention, the scope of which is defined in the appended claims and their equivalents.

What is claimed is:

1. A projector comprising:

an image source configured to generate an image light and emit the image light, the image light comprising a bright-state region image light and a dark-state region image light; and a transmission and reflection element comprising a plurality of transmission and reflection units, wherein each of the transmission and reflection units has a reflective state and a transmissive state, and is configured to reflect the image light irradiated thereon when in the reflective state, and to transmit the image light irradiated thereon when in the transmissive state;

wherein the transmission and reflection element is disposed on a light output side of the image source, and is configured to perform one of a transmission and a reflection on the bright-state region image light so that the bright-state region image light is projected and displayed, and to perform the other of the transmission and the reflection on the dark-state region image light so that the dark-state region image light is not projected and displayed.

2. The projector of claim 1, wherein:

the transmission and reflection unit comprises an electrochromic unit.

3. The projector of claim 1, wherein:

the plurality of transmission and reflection units are arranged in an array.

4. The projector of claim 1, wherein:

the image source further comprises a display unit comprising a plurality of pixels.

5. The projector of claim 4, wherein:

the dark-state region image light corresponds to an image light of the pixel having a gray scale value of zero.

6. The projector of claim 4, wherein:

one of the plurality of transmission and reflection units which is in the transmissive state corresponds to at least one of the plurality of pixels which is in the closed state, or one of the plurality of transmission and reflection units which is in the reflective state corresponds to at least one of the plurality of pixels which is in the closed state.

7. The projector of claim 4, wherein:

the plurality of transmission and reflection units of the transmission and reflection element are in a one-to-one correspondence with the plurality of pixels of the display unit, and an image light emitted by every one of the plurality of pixels of the display unit is irradiated on one of the transmission and reflection units corresponding to the one of the plurality of pixels.

8. The projector of claim 7, further comprising:

a first control unit configured to control each of the plurality of pixels to be in an open state or in a closed state; and a second control unit configured to control each of the plurality of transmission and reflection units to be in the reflective state or in the transmissive state, wherein the first control unit and the second control unit are further configured to control one of the plurality of transmission and reflection units to be in the transmissive state when one of the plurality of pixels corresponding to the one of the plurality of transmission and reflection units is in the closed state, or to control one of the plurality of transmission and reflection units to be in the reflective state when one of the plurality of pixels corresponding to the one of the plurality of transmission and reflection units is in the closed state.

9. The projector of claim 7, wherein:
the dark-state region image light corresponds to an image light of the pixel having a gray scale value of zero.

10. The projector of claim 9, wherein:
the transmission and reflection element is configured to perform the reflection on the bright-state region image light so that the bright-state region image light is projected and displayed, and to perform the transmission on the dark-state region image light so that the dark-state region image light is not projected and displayed, and
the projector further comprises a light absorbing layer disposed on a side of the transmission and reflection element away from the image source, and configured to absorb the dark-state region image light transmitted by the transmission and reflection element.

11. The projector of claim 7, wherein:
one of the plurality of transmission and reflection units which is in the transmissive state corresponds to one of the plurality of pixels which is in the closed state, or
one of the plurality of transmission and reflection units which is in the reflective state corresponds to one of the plurality of pixels which is in the closed state.

12. The projector of claim 4, wherein:
the image source further comprises a magnifying element disposed between the display unit and the transmission and reflection element and configured to magnify an image generated by the display unit.

13. The projector of claim 12, wherein:
every one of the plurality of transmission and reflection units of the transmission and reflection element has a greater area than at least one of the plurality of pixels, corresponding to the one of the plurality of transmission and reflection units, of the display unit.

14. The projector of claim 1, further comprising:
a receiving screen configured to receive the image light transmitted or reflected by the transmission and reflection element to display an image.

15. The projector of claim 1, wherein:
each of the plurality of transmission and reflection units comprises a first electrode, a second electrode, a transmission and reflection layer disposed between the first electrode and the second electrode, and an electrolyte layer and an ion storage layer which are disposed between the transmission and reflection layer and the first electrode, the transmission and reflection layer comprises a reflective transition metal oxide, and the transmission and reflection units of the transmission and reflection element are configured to switch between the transmissive state and the reflective state under the control of an external voltage.

16. A method of driving a projector, the projector comprising:
an image source comprising a display unit, the display unit comprising a plurality of pixels; and
a transmission and reflection element comprising a plurality of transmission and reflection units, wherein each of the transmission and reflection units has a reflective state and a transmissive state, and the plurality of transmission and reflection units of the transmission and reflection element are disposed on paths of lights emitted by the plurality of pixels of the display unit,
the method comprising:
driving some of the plurality of pixels of the display unit into a closed state and driving the others of the plurality of pixels into an open state; and
driving some of the plurality of transmission and reflection units of the transmission and reflection element into the reflective state and driving the others of the plurality of transmission and reflection units into the transmissive state,
wherein while driving some of the plurality of pixels into the closed state, at least one of the plurality of transmission and reflection units which corresponds to the driven pixels is driven into the transmissive state; or
wherein while driving some of the plurality of pixels into the closed state, the at least one of the plurality of transmission and reflection units which corresponds to the driven pixels is driven into the reflective state.

17. The method of claim 16, wherein:
the plurality of transmission and reflection units of the transmission and reflection element are in a one-to-one correspondence with the plurality of pixels of the display unit.

18. The method of claim 16, wherein:
the at least one of the plurality of transmission and reflection units transmits or reflects an image light emitted by the driven pixels and irradiated on the at least one of the plurality of transmission and reflection units, so that the image light is not projected and displayed.

19. The method of claim 16, wherein:
the transmission and reflection unit comprises an electrochromic unit.

20. The method of claim 16, wherein:
the pixels driven into the closed state are pixels having a gray scale value of zero.

* * * * *